No. 806,429. PATENTED DEC. 5, 1905.
G. G. REMIREZ.
MACHINE FOR DECORTICATING PLANTS.
APPLICATION FILED AUG. 17, 1903.
4 SHEETS—SHEET 1.
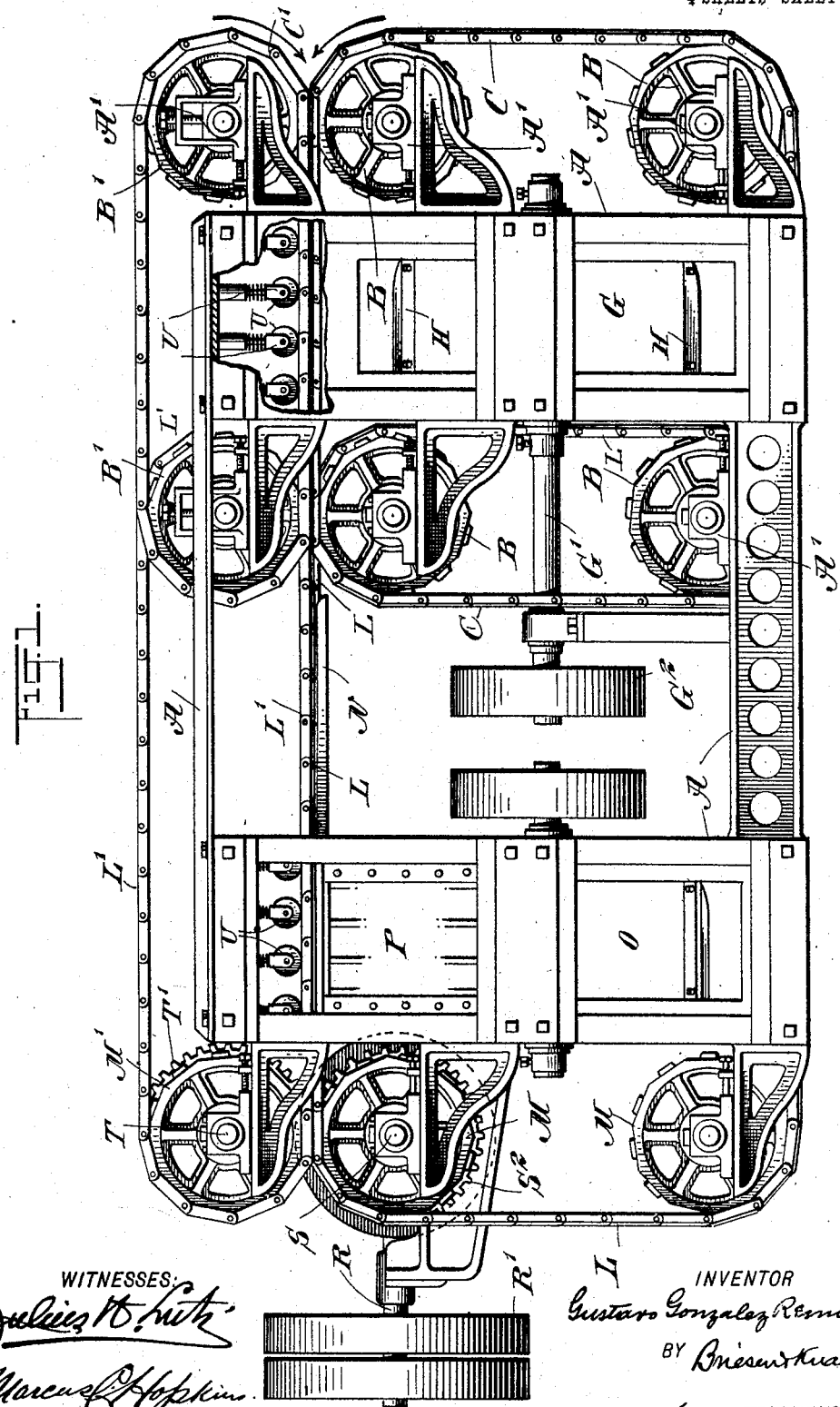
WITNESSES
INVENTOR
Gustavo Gonzalez Remirez
BY
his ATTORNEYS

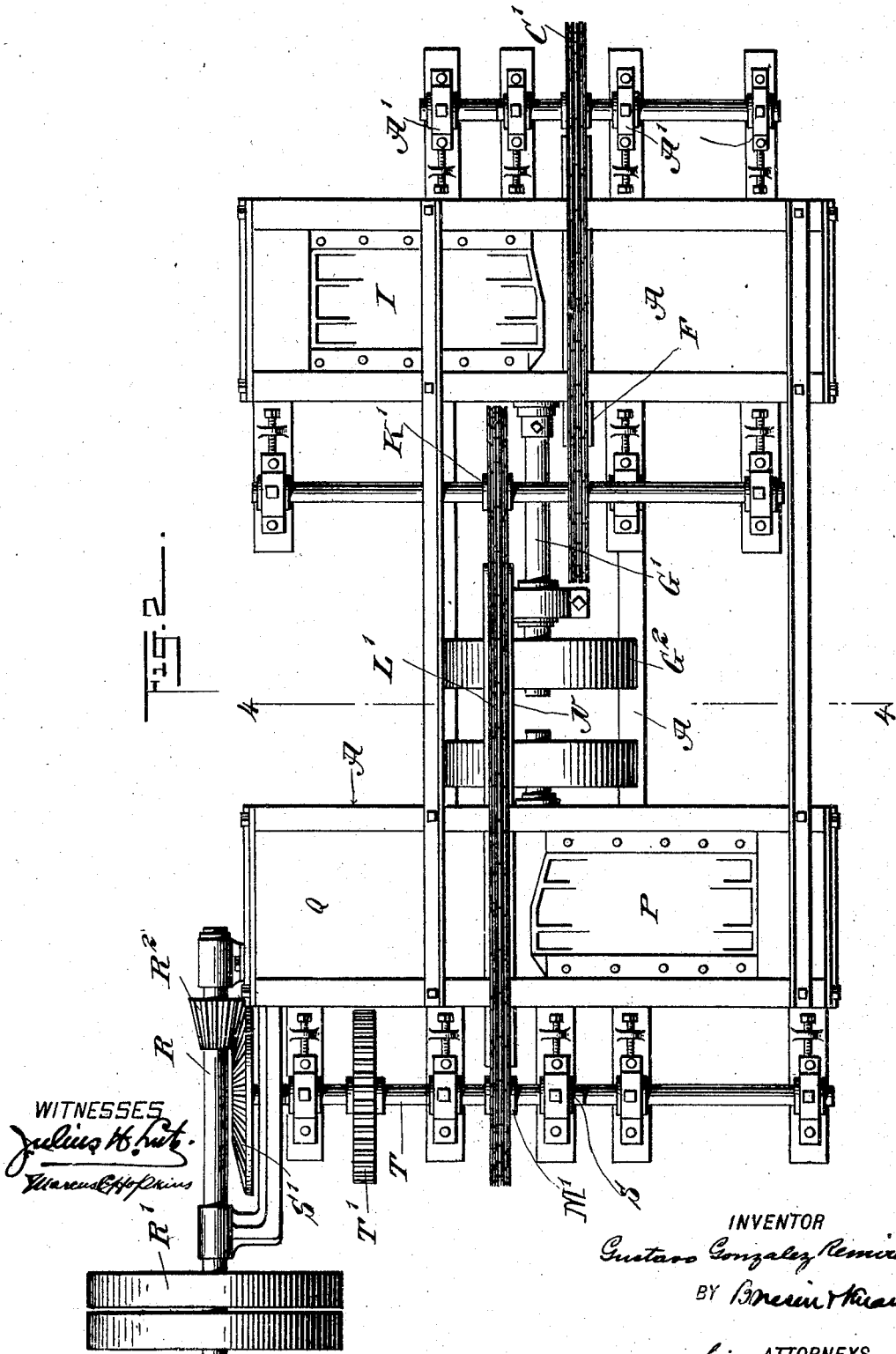

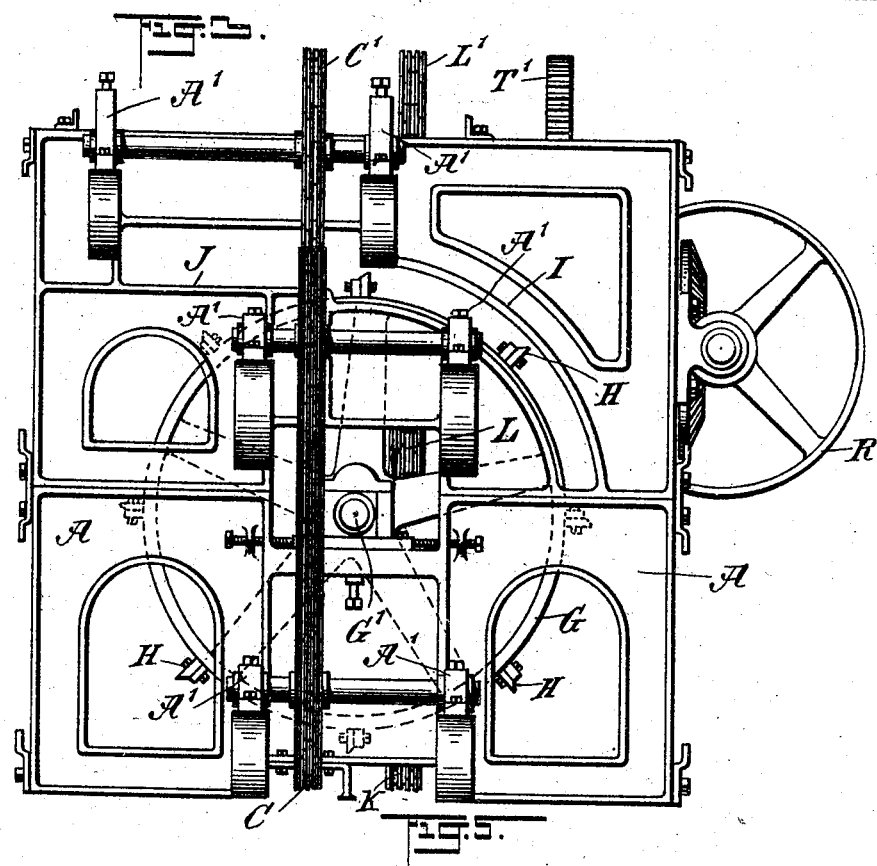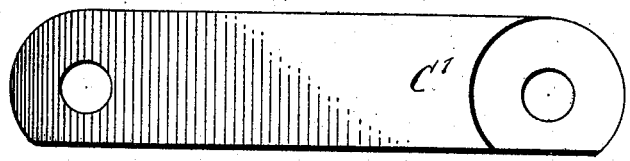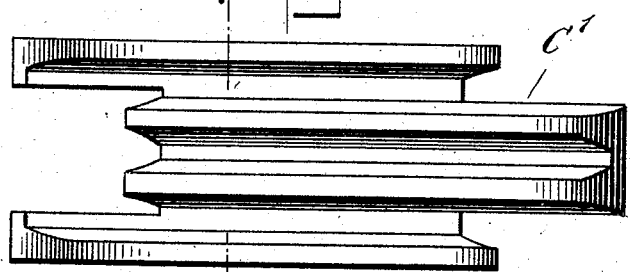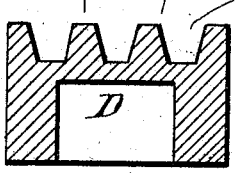

No. 806,429. PATENTED DEC. 5, 1905.
G. G. REMIREZ.
MACHINE FOR DECORTICATING PLANTS.
APPLICATION FILED AUG. 17, 1903.
4 SHEETS—SHEET 4.
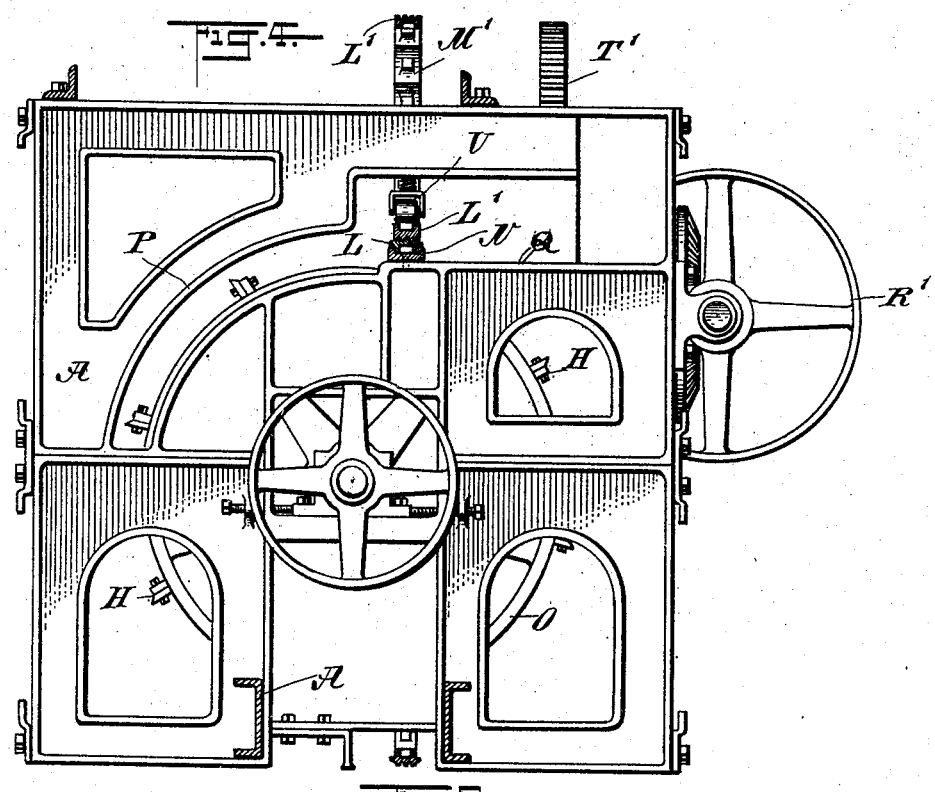
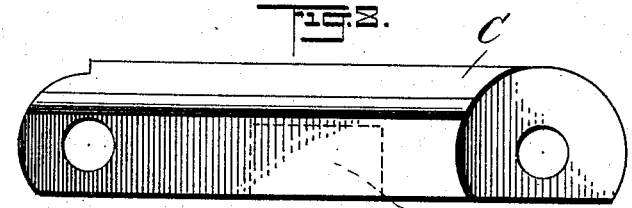
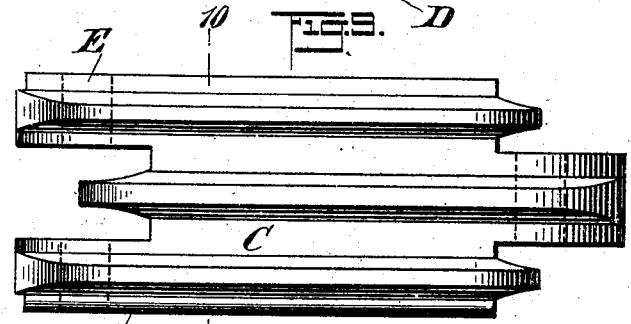
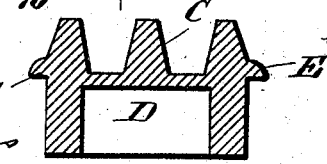
WITNESSES:
INVENTOR
Gustavo Gonzalez Remirez
BY
his ATTORNEYS

UNITED STATES PATENT OFFICE.

GUSTAVO GONZALEZ REMIREZ, OF MERIDA, MEXICO.

MACHINE FOR DECORTICATING PLANTS.

No. 806,429.   Specification of Letters Patent.   Patented Dec. 5, 1905.

Application filed August 17, 1903. Serial No. 169,703.

*To all whom it may concern:*

Be it known that I, GUSTAVO GONZALEZ REMIREZ, a citizen of the Mexican Republic, and a resident of Merida, Yucatan, Mexico, have invented certain new and useful Improvements in Machines for Decorticating Plants, of which the following is a specification.

My invention relates to machines for crushing or decorticating the leaves of various plants with the object of preparing them for spinning purposes.

The object of my present invention is to provide a simple, compact, and efficient machine for the above-indicated purposes.

The invention will be fully described hereinafter and the features and novelties pointed out in the appended claims.

Reference is to be had to the accompanying drawings, in which—

Figure 1 is a front elevation of my improved machine. Fig. 2 is a plan thereof. Fig. 3 is an end elevation from that side on which the material enters the machine. Fig. 4 is a cross-section taken on line 4 4 of Fig. 2. Fig. 5 is a detailed outside view of a chain-link employed in the machine. Fig. 6 is an inside view of the same chain-link. Fig. 7 is a cross-section of said chain-link, taken on line 7 7 of Fig. 6. Fig. 8 is an outside view of a link of the chain which coöperates with the one whose links are illustrated by Figs. 5, 6, and 7. Fig. 9 is an inside view of the chain-link shown in Fig. 8, and Fig. 10 is a cross-section taken on line 10 10 of Fig. 9.

The machine comprises a suitable frame A, which at one end has suitable bearings A' for the shafts of sprocket-wheels B B'. These sprocket-wheels are all located in the same vertical plane, and there are four sprocket-wheels B, which serve as carriers and guides for a chain C, the links of which are illustrated by Figs. 8, 9, and 10. Each of said chain-links is substantially smooth upon its inner surface, except that a recess D is provided, which is adapted to be engaged by the teeth of the sprocket-wheels B. The outer surfaces of the chain-links are grooved, as is clearly shown in Figs. 8, 9, and 10. In addition to this the links are provided with projections E, which are adapted to rest on a stationary guide F, arranged between the two upper sprocket-wheels B. Thus the upper run of the chain C will be evenly supported. There are two sprocket-wheels B', which are engaged by a chain C', the links of which are similar in construction to those of the chain C, with the exception that the projections E are omitted and that the outer surface of each link is so formed that the links of the upper chain C' will project with their teeth between those of the links of the lower chain. (See Figs. 5, 6, and 7.) The chains in operation travel in the direction indicated by the arrows in Fig. 1. The material in the form of leaves is introduced where the two chains run together, and the operator so feeds the leaves that they will be engaged about at the center, so that the leaves will extend to either side of the chains. Owing to the intermeshing of the chain-links, the leaves will be carried along positively and while the leaves are being held between the chains and the lower chain rests on the guide F a crushing action is effected by the following instrumentality.

In the frame A is journaled a crushing-wheel G, the shaft G' of which is provided with a pulley $G^2$, by means of which motion may be imparted to the crushing-wheel G. This wheel carries on its periphery knives or blades H, which extend lengthwise and which project to a smaller distance from the axis at the entrance of the apparatus than toward the outlet. The knives are adapted to coöperate with a stationary crushing-surface I, curved according to the arc of a circle, the center of which is the axis of the shaft G', and this crushing-surface is cylindrical, so that there is formed between said surface and the knives a passage or throat, the width of which decreases from the inlet toward the outlet. As shown in Fig. 3, one portion of the leaves carried along by the chains C C' hangs in the space between the said guide I and the periphery of the crushing-wheel G. The other half of the leaves is temporarily supported upon a table J, so that said half will not come into operative relation to the knives. Thus it will be understood that the guide I is on one side of the chains C C' and the table J on the other side of said chains. The plane of the chains is preferably slightly to one side of a vertical plane passing through the shaft G', as shown in Fig. 3.

The sprocket-wheels B B', which are located toward the outlet of the apparatus, are mounted on shafts, each of which carries a second sprocket-wheel K K', respectively, and these sprocket-wheels act as carriers for another set of chains L L', which also pass over sprocket-wheels M M'. These two chains L L' are constructed exactly in the same manner as the chains C C'—that is to say, their adjacent runs intermesh—and the upper run of the lower chain L is supported by a stationary guide N. The plane in which the chains L L′ are arranged and the plane of the chains C C′ are preferably on opposite sides of a vertical plane passing through the shaft G′; but in any event the two sets of chains are arranged in different planes, so that the second set of chains will take hold of the material which has been subjected to the action of the first crushing-wheel G and will carry the leaves to the second crushing-wheel O. This wheel is constructed in the same manner as the wheel G, but rotates in the opposite direction. In connection with the second crushing-wheel there is also provided a stationary crushing member P and a table Q for supporting that portion of the leaves which is not subjected to the action of the second crushing-wheel. It will be understood by reference to Fig. 1 that the leaves are taken hold of by the chains L L′ before the chains C C′ have released the leaves.

The bearings of the sprocket-wheels are preferably adjustable, as shown, so that the tension of the chains may be regulated. The driving mechanism of the sprocket-wheels may be of any suitable description. I have shown a shaft R, with pulleys R′, on which shaft is carried a beveled pinion R², meshing with a beveled gear S′ on a shaft S, which carries the upper sprocket-wheel M. This shaft also carries a spur-gear S², meshing with a spur-gear T′ on the shaft T of the left-hand sprocket-wheel M′. The other sprocket-wheels are rotated simply through the medium of the respective chains.

It will be understood that the material enters at the right in Fig. 1 and is carried along by the chains C C′, which, owing to their intermeshing teeth, have a very firm grip on the material. As the leaves pass between the crushing member I and the crushing-wheel G they are exposed on one side of the chains C C′ to the action of the blades or knives H, and it will be observed that the crushing action increases gradually, since the throat between the knives and the stationary crushing member decreases in width. While this crushing action takes place the chains which hold the leaves are firmly supported both against downward and against lateral movement by the guide F. After this crushing action has been completed and while the leaves are still being held by the chains C C′ the leaves are seized at a different point by the chains L L′, which then bring into operative relation to the crushing-wheel O those portions of the leaves which have not been operated upon by the crushing-wheel G. In this case also the chains are firmly supported and held against swaying at those points where they hold the leaves in operative relation to the crushing-wheel. Finally, the leaves are discharged from the machine at the point where the chains L L′ separate. The improved machine is very simple and compact, and owing to the similarity of the several parts repairs are easily made, if necessary.

I desire to particularly point out the great compactness of the machine, which is obtained by placing the wheels G O at the center of the machine with their axes in a vertical plane which lies between those in which the chains C C′ on one hand and L L′ on the other hand are arranged. In fact, in practice the axes of the wheels G O are in exact alinement. Each of the crushing-wheels G O is located partly between the upper and lower runs of the chains C L, respectively. Thus the width of the machine is but slightly in excess of that required for the operation of one of the crushing-wheels, and the length of the machine is also comparatively small. Another feature to which I wish to call particular attention is the fact that the conveying-chains C C′ have their contiguous runs located at a level which is slightly higher than the operative upper portion of the adjacent crushing-wheel G. The same remark applies as to the relative position of the chains L L′ and the crushing-wheel O. Owing to this arrangement, the fibers which have been subjected to the action of the crushing-wheel G are readily seized by the chains L L′ and the untreated portions of the leaves properly presented to the second crushing-wheel O without the use of any intermediate device for transferring the leaves from the first set of conveying-chains C C′ to the second set of chains L L′.

Various modifications may be made without departing from the nature of my invention.

I have provided spring-pressed rollers U, which bear upon the upper surface of the lower reaches of chains C′ and L′ at those points where said chains are gripping the leaves during their decortication by the crushing-wheels. This construction assures a firm grip of the leaf between the chains.

I claim as my invention—

1. The combination with two sets of conveyers arranged to successively carry the material, of crushing-wheels arranged in operative relation to the respective sets of conveyers and projecting between the runs of one of said conveyers, the said runs being straight and arranged on opposite sides of the crushing-wheel's axis.

2. The combination of superposed intermeshing chains adapted to seize and carry the material, the links of the lower chain being provided with lateral projections, a stationary guide arranged to engage the said projections at the upper run of the lower chain, means for pressing against the lower run of the upper chain toward said stationary guide and a crushing-wheel adjacent to said chains.

3. The combination with two sets of superposed conveyers arranged to successively carry the material, of crushing-wheels arranged in operative relation to the respective sets of conveyers and each projecting between the runs of the lower conveyer of the respective set, the said runs being straight and arranged on opposite sides of the crushing-wheel's axis.

4. The combination of intermeshing chains adapted to seize and carry the material, the links of one of said chains having projections, a stationary guide adapted to engage said projections at that run of said chain which is adjacent to the other chain, and a crushing-wheel adjacent to the engaging runs of the chains.

In testimony whereof I have hereunto set my hand in the presence of two subscribing witnesses.

GUSTAVO GONZALEZ REMIREZ.

Witnesses:
JOHN LOTKA,
EUGENE EBLE.